United States Patent [19]

Davis

[11] Patent Number: 4,678,926

[45] Date of Patent: Jul. 7, 1987

[54] CHRISTMAS TREE LIGHTING CONTROL

[76] Inventor: George B. Davis, 7512 Marbury Rd., Bethesda, Md. 20034

[21] Appl. No.: 826,369

[22] Filed: Feb. 5, 1986

[51] Int. Cl.[4] .......... H02J 3/00

[52] U.S. Cl. .......... 307/11; 307/38; 307/132 R; 307/31; 315/155; 315/158

[58] Field of Search .......... 307/11, 31, 34, 35, 307/30, 28, 38, 112, 113, 114, 115, 116, 117, 132 R, 132 E; 200/27 BA, 27 BB, 38 B, 38 D; 315/185 R, 185 S, 186, 187, 150–159; 338/89

[56] References Cited

U.S. PATENT DOCUMENTS

| | | | |
|---|---|---|---|
| 3,459,943 | 8/1969 | Harnden | 315/156 X |
| 3,555,351 | 1/1971 | Sherwin | 315/154 |
| 3,564,332 | 2/1971 | Blakeslee | 315/154 |
| 3,584,962 | 6/1971 | Irwin | 315/155 X |
| 3,767,924 | 10/1973 | Charles et al. | 315/159 X |
| 3,862,434 | 1/1975 | Davis | 307/132 |
| 3,898,512 | 8/1975 | Buck | 315/153 X |
| 3,962,600 | 6/1976 | Pittman | 315/159 X |
| 4,057,735 | 11/1977 | Davis | 307/11 |
| 4,125,781 | 11/1978 | Davis | 307/11 |
| 4,153,860 | 5/1979 | Vonick | 315/155 |
| 4,215,277 | 7/1980 | Weiner et al. | 307/132 R X |
| 4,225,808 | 9/1980 | Saraceni | 315/154 X |
| 4,293,796 | 10/1981 | McMorrow | 315/159 X |
| 4,368,406 | 1/1983 | Kruzich et al. | 315/158 |

*Primary Examiner*—William M. Shoop, Jr.
*Assistant Examiner*—Shik Luen Paul Ip

[57] ABSTRACT

This invention relates generally to ornamental lighting controls and particularly to a lighting control for Christmas tree lighting having preferably at least four duty cycle outputs and wherein the duty cycle pattern of each output differs, with respect to a predetermined time interval, from the duty cycle pattern of each of the other outputs of the control thereby to produce, in a plurality of ornamental lighting strings respectively connected to the outputs of the control, a coordinated condition of continuously changing light intensities between strings that occur in predetermined sequential time differing order to result in an overall lighting effect totally unobtainable by any other form of light controlling apparatus.

The present device is an improvement over applicant's U.S. Pat. Nos. 4,057,735 and 4,125,781, by providing a mechanism responsive to light intensity changes rather than rubbing resistance surfaces thereby a mechanism substantially free of wear or changes in operational characteristics as the result of wear.

2 Claims, 7 Drawing Figures

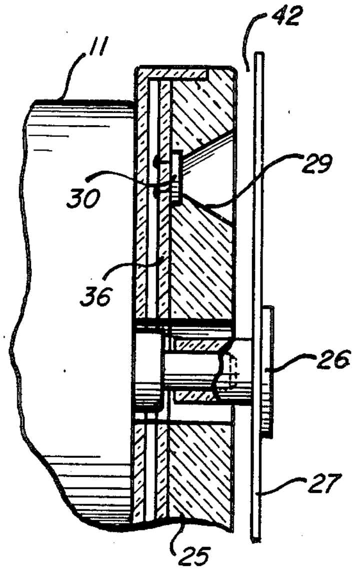
Fig. 3
Fig. 6
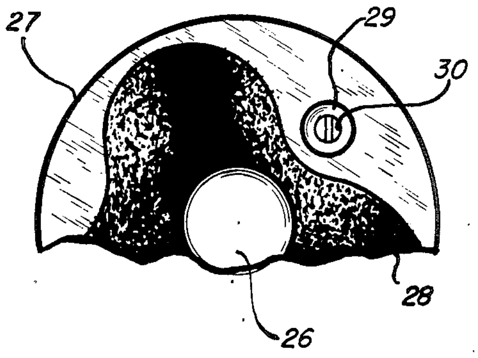
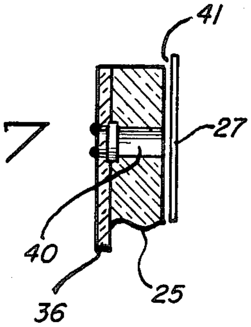
Fig. 7
Fig. 5
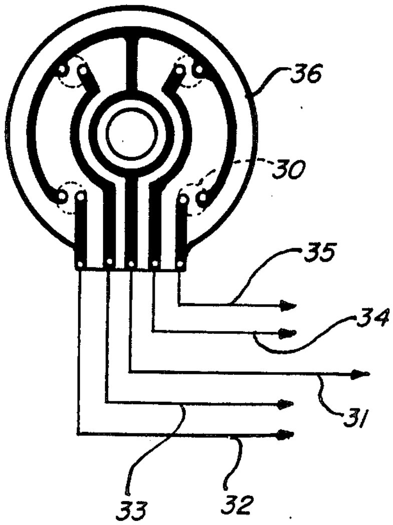
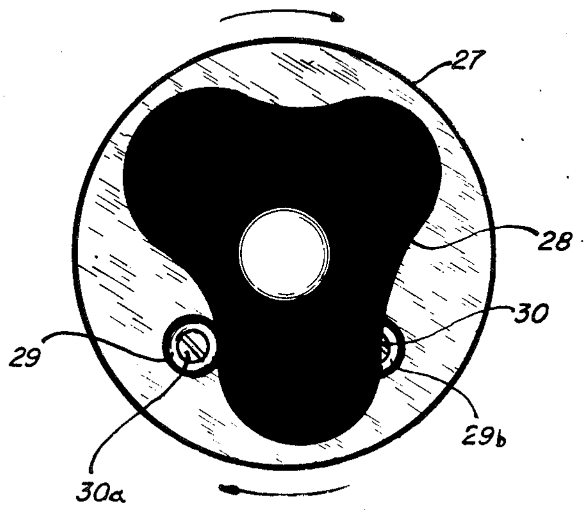
Fig. 4

CHRISTMAS TREE LIGHTING CONTROL

This invention relates generally to ornamental lighting controls and more specifically to such a control wherein a plurality of lighting strings, such as upon a Christmas tree, are caused to vary individually in light output intensity and in predetermined time differing coordinated sequence to effect an overall light intensity output from the tree that remains substantially constant during such light intensity changes to produce a soft, pleasing, shimmering of all the tree lights, restful to observe and highly in contrast to the annoying effect produced by the conventional flasher or by individually controlled lighting strings that invariably reach a state of synchronization to produce a similar type "tree on" "tree off" condition.

It is an object of the present invention to provide a decorative lighting control that includes a plurality of duty cycle units having respectively variable duty cycle outputs to which may be respectively connected strings of ornamental lights, the control being operative to effect continuous coordinated changes in the duty cycle output of each of the duty cycle units with the duty cycle output pattern of each unit varying, with respect to a predetermined time interval, from the duty cycle output pattern of each of the other units of the control to produce, in respectively connected lighting strings, a coordination of lighting effects unobtainable by any other form of lighting control apparatus.

A still further object is to provide an improvement in a Christmas tree lighting control that includes a plurality of solid state duty cycle units with each unit including an RC gating or triggering circuit and wherein within each RC circuit is included a photoelectric cell positioned to respond to respectively differing random like light intensity changes applied thereto to correspondingly change in resistance as required to produce similar respectively differing duty cycle changes in its associate duty cycle unit and output thereof. This operates to effect similar random like light intensity changes in each lighting source respectively connected to the outputs of the units that will differ in output pattern one from the other for a predetermined operating interval of the unit.

A still further object is to provide a decorative lighting control that includes a plurality of solid state duty cycle units having respectively variable duty cycle outputs to which may be respectively connected strings of ornamental lights and wherein is included means for manually varying selectively the duty cycle output pattern of each unit.

A further object is to provide an ornamental lighting control that is rugged in structure, reliable and simple in operation, inexpensive to manufacture, yet capable of handling high current loads for long periods of time.

Other objects and advantages will become apparent when referring to the accompanying description and drawings wherein:

FIG. 3 is a fragmentary view partly in section and partly in elevation, of the motor, baffle and transparent disk assembly as mounted on the motor.

FIG. 4 is a plan view of the printed face of the transparent disk as positioned before the baffle wherein are mounted the four photoelectric cells of the device.

FIG. 5 is a plan view of the printed circuit board to which in use, are positioned and secured respective photoelectric cells of the device.

FIG. 6 is a fragmentary plan view of the transparent disk as mounted on the motor and illustrating an alternate form of the printed surface thereon.

FIG. 7 is a fragmentary view in section of an alternate configuration of the port as extending through the baffle and by way of which light is directed against the photoelectric cells positioned within the baffle.

Figure 1:
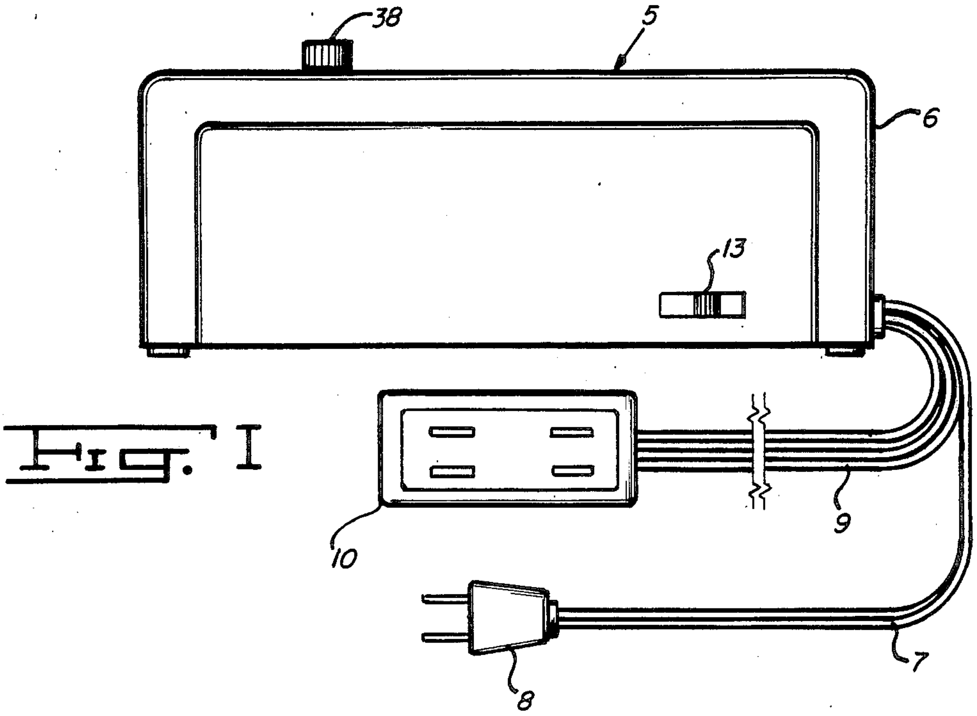
FIG. 1 is a side view in elevation of the assembled lighting control of the present device and showing the input and output leads extending from the lighting control case.

Referring now to the drawings and more particularly to FIG. 1 thereof wherein is shown an assembly of the present invention as will be generally designated 5. The assembly includes the case 6 within which is inclosed the working mechanism of the device. A supply card 7 having thereon a connector plug 8, extends from the case and provides means for electrically connecting the control to an AC power source.

Additionally extending from the case is a multiple conductor cord 9 that includes a multiple outlet connector 10 into which in use, may be respectively plugged four independently operating strings of ornamental lights, such for example, as those used upon a Christmas tree. These lights may be wired either in series or in parallel. The cord 9 may be of any suitable length for extending well up into the tree to permit easy access to the lighting strings while allowing the case 6 to remain under the tree or some convenient distance away.

Figure 2:
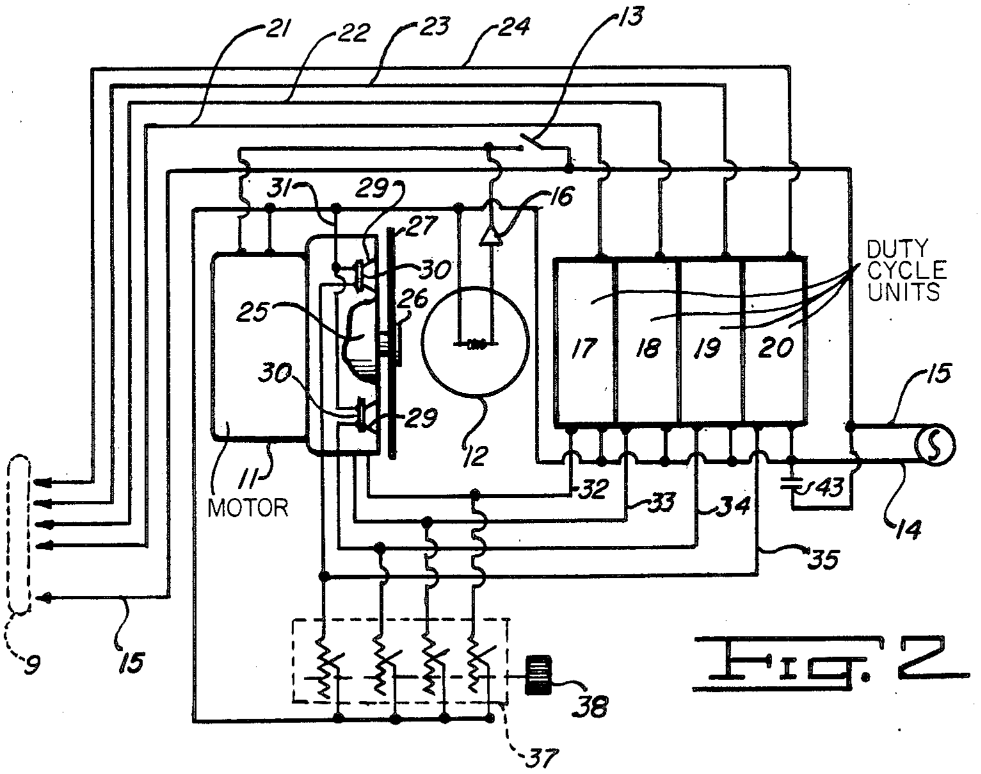
FIG. 2 is a plan view partly in elevation and partly in schematic of the device of the invention as contained within the case as shown in FIG. 1.

FIG. 2 shows in schematic the circuitry and relative arrangement of the various components of the device as are inclosed within case 6. Here the drive motor 11 of the mechanism and lamp 12 are shown as commonly connected, by way of switch 13, to the power supply leads 14 and 15, Desirably, connected in the lamp circuit, is a diode 16 that here operates to prolong the life of the standard lamp shown while further providing for reducing lamp heat within the case. It is understood that LED's or a low watt long life lamp may be used here and thereby iliminate the diode.

Shown as connected to lead 14 are four duty cycle units 17, 18, 19 and 20 from which respectively extend the varying duty cycle output leads 21, 22, 23 and 24. These output leads from each of the units, along with supply lead 15, extend from the case to the connector 10 by way of which the various lighting strings to be controlled are respectively connected to the outputs of the units. These duty cycle units 17, 18, 19 and 20 are herein shown in schematic block for the reason that such solid state duty cycle units are well known in the electronic art and may be variously constructed to generally include an SCR, DIAC or TRIAC or similar operating electronic components. The requirement here being that each duty cycle unit's circuitry shall include an RC gating circuit wherein the resistance value of the gating circuit resistor elements determines the duty cycle output of the unit.

The lamp 12 and drive motor 11 are shown as connected by way of switch 13, to supply leads 14 and 15. Throwing of switch 13 to "on" position will place the motor and lamp in operation. Motor 11 has a shaft speed of 8 to 16 RPM and here desirably the drive is variable in speed. To the motor is secured a relatively thick baffle plate 25, FIG. 3, through which extends the motor shaft. Pressed over the motor shaft is hub 26 to which is cemented a transparent disk 27 upon which has been printed a selectively configured surface 28, FIGS. 4 and 6.

Extending through baffle 25 are four conically formed ports 29 wherein within each port is positioned a photoelectric cell 30. Each of these cells are connected commonly by lead 31 to the supply lead 14 and respectively within the circuitry of the units by way of leads 32, 33, 34 and 35. A printed circuit board 36, such as shown in FIG. 5 may be provided for connecting the cells within the circuitry of the units further providing for positioning the cells within the ports through the baffle.

Connected in parallel with each photoelectric cell within each unit's circuitry, is a variable resistor 37 that is commonly controlled by knob 38. These variable resisters are connected respectively in parallel with each cell and thereby allows the operator to selectively regulate the gate of each of the four duty cycle units of the device by rotation of knob 38. By knob 38 the duty interval of each of the units may be so varied and consequently the lighting response of each lighting source respectively connected to the outputs of the units.

In operation, rotation of the printed disk 27 between the lighted lamp 12 and the four photoelectric cells within the baffle, effects respectively different and continuously changing light intensity variations being applied respectively to the cells to produce in the cells random like resistance changes that effects corresponding changes in the duty interval of its related duty cycle unit and output thereof. These duty cycle changes in each of the unit's outputs effects corresponding light intensity changes in respectively connected lighting strings and wherein the light output pattern of each of these lighting strings will differ one from the other, both as to intensity and duration, for a predetermined operating interval of the control.

In FIG. 4 is shown the surface of the transparent disk 27 whereupon is illustrated, as an example, the printed surface 28. Here it will be noted that cell 30*a* is receiving full light as applied to the cell by lamp 12. The lighting string connected to this cell, by way of its respective duty cycle unit, will be full "on" in brightness while a string connected to cell 30*b*, by way of its unit, will be substantially at "half" brightness. The other two cells within the baffle are shown as covered and therefore are receiving no light.

The lighting strings connected to these covered cells will be "off". By reason of the movement of disk 27, these strings would normally flash, however, because of the variable resistor 37 connected in parallel with each of these cells, by rotation of knob 38, the operator may adjust the gate to increase the duty interval of these units as required to extablish the minimum light output intensity level desired. This applies to all the lighting strings upon the tree. Therefore, unless desired, there will be no flashing of any of the lights after the base light output intensity level has been established. By rotation of knob 38 the lights upon the tree may be varied upward from a "flashing" to a pronounced "twinkling" or further to a soft "shimmering" or still further to a steady state of "brightness". By throwing switch 13 to "off" thereby disconnecting the lamp and motor, the knob 28 may now be rotated to adjust the steady state tree lights to the lighting desired from full "on" to a full "off" condition.

FIG. 6 illustrates an example of how the printed surface upon the disk 27 may be selectively shaded to further extend the varying light output intensity range of connected lights.

FIG. 7 illustrates how by narrowing the ports through the baffle, as shown by 40, and closely positioning the disk 27 to the baffle as at 41, will result in relatively sharp duty cycle change occurring and consequently produce more distinct intensity changes in connected lights. This is not necessarily a desired feature of the present apparatus.

Referring back to the previously described structure, the thickness of baffle 27, the conical configuration of the ports within the baffle and the spacing of the disk, as at 42, from the baffle, will each contribute to the relative slow and gradual light intensity changes desired of the device. If the lighting strings are properly arranged upon the tree, as by somewhat entwining the strings, these gradual random like occurring light intensity changes will produce an effect that tends to isolate each individual light upon the tree although the lights are connected in series. In contrast to these gradual occurring light changes, any sharp light intensity change as by flashing or flickering of a lighted string will instantly isolate and identify that string and detract from the overall appearance of the tree as would a flashing string positioned among lights operating from the outputs of the present control.

The advantage of the control as herein shown is that it provides means for coordinating the operation of a number of independent lighting sources to produce and continuously maintain an overall lighting effect unobtainable by other forms of light controlling apparatus. Further by proper selection of the configuration of the printed surface upon the transparent disk, the respective light intensity output patterns between lighting sources connected respectively to the duty cycle outputs of the units may be programmed to be varying and overlapping in nature whereby the varying light intensity output throughout, say a lighted Christmas tree, will remain substantially constant while a continuous shimmering effect is maintained throughout the tree.

The duty cycle unit as shown by 17, 18, 19 and 20 shall be understood to mean any suitable type of solid state assembly wherein the resistance value of the RC gaiting circuit resistor, within the unit, determines the duty cycle output of the unit. Duty cycle shall be understood to mean the ratio between the portion of the AC cycle that the unit is "on" or conducting current to the "off" time of the cycle when "no" or relatively no current is being passed. These "on" and "off" intervals occur very rapidly with the relative duration of these intervals being controlled by the design of the gating or triggering circuit to the SCR, TRIAC or DIAC or such similar operating electronic elements of the unit circuitry. The duty cycle or "conducting" interval of the cycle as it relates to the "off" interval, determines the relative heating and cooling time of the incandescent lamp filament and consequently the light intensity output of the lighting source connected to the unit.

While herein is shown a simple form of the device that is highly effective in its operation, it is understood that various modifications may be made therein without departing from the inventive concept shown.

What I therefore claim and desire to cover by Letters Patent is:

1. An ornamental lighting control including in combination, a plurality of solid state duty cycle units having a common input and respectively variable duty cycle outputs, connector means respectively connected to each unit's output for connecting thereto an ornamental lighting source with the duty cycle of the output determining the light output intensity of a lighting source connected therewith, an RC gating circuit included in each duty cycle unit and wherein the resistance value of the gating circuit resistor determines the duty cycle of the unit and output thereof, a plurality of photoelectric cells with each of said cells being respectively connected within the RC gating circuitry of each of said duty cycle units and responsive individually to varying light intensities applied thereto vary respectively in resistance as required to effect corresponding duty cycle changes in its associate duty cycle unit and output thereof, light applying means positioned to apply light respectively to each of said cells, light control means operable to effect random like occurring variations in the light as respectively applied to each of said cells whereby the applied varying light pattern between cells differ one from the other for a predetermined operating interval of said light control means and a variable resistor respectively connected in parallel with each of said photoelectric cells and manually adjustable in resistance to vary selectively the duty cycle of its related duty cycle unit and output thereof.

2. An ornamental lighting control for Christmas tree lighting including in combination, a plurality of solid state duty cycle units each having a common input and respectively variable duty cycle outputs, connector means respectively connected to each unit's output for connecting thereto an ornamental lighting source, an RC gating circuit included in each duty cycle unit and wherein the gating circuit resistor determines the duty cycle of the unit and output thereof, a plurality of photoelectric cells with each of said cells being respectively connected within the RC gating circuitry of each of said duty cycle units and responsive to changing light intensity variations applied respectively thereto to vary respectively in resistance as required to effect corresponding like variations in the duty cycle of its related duty cycle unit and output thereof, light applying means positioned to apply light respectively to each of said photoelectric cells, motor means, means movable by said motor means to effect random like variations in the light as applied respectively to the cells whereby the varying light pattern as applied to each of said cells differ between cells one from the other for a predetermined operating interval of said motor means and a variable resistor respectively connected in parallel with each photoelectric cell and manually adjustable in resistance to vary selectively the duty cycle of its related duty cycle unit and output thereof.

* * * * *